(12) United States Patent
Aono et al.

(10) Patent No.: US 7,287,165 B2
(45) Date of Patent: Oct. 23, 2007

(54) IC CARD, PORTABLE TERMINAL, AND ACCESS CONTROL METHOD

(75) Inventors: Hiroshi Aono, Yokosuka (JP); Kazuhiko Ishii, Yokohama (JP); Kensaku Mori, Yokohama (JP); Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 728 days.

(21) Appl. No.: 10/419,941

(22) Filed: Apr. 22, 2003

(65) Prior Publication Data

US 2004/0019790 A1    Jan. 29, 2004

(30) Foreign Application Priority Data

Apr. 23, 2002 (JP) ............................ P2002-121064

(51) Int. Cl.
*G06F 1/24* (2006.01)
(52) U.S. Cl. ........................ 713/182; 713/186; 713/194
(58) Field of Classification Search ................ 713/182, 713/186, 194
See application file for complete search history.

(56) References Cited

U.S. PATENT DOCUMENTS

| | | | | |
|---|---|---|---|---|
| 3,806,882 | A | * | 4/1974 | Clarke ........................ 711/164 |
| 3,924,065 | A | * | 12/1975 | Freeny, Jr. ................... 375/274 |
| 3,946,220 | A | * | 3/1976 | Brobeck et al. .............. 705/25 |
| 3,956,615 | A | * | 5/1976 | Anderson et al. ............. 705/72 |
| 4,853,522 | A | | 8/1989 | Ogasawara |
| 5,917,912 | A | * | 6/1999 | Ginter et al. ................ 713/187 |
| 6,016,476 | A | | 1/2000 | Maes et al. |
| 6,101,477 | A | | 8/2000 | Hohle et al. |

2005/0091521 A1    4/2005  Terada et al.

FOREIGN PATENT DOCUMENTS

| | | |
|---|---|---|
| EP | 0 950 968 | 10/1999 |
| EP | 1 069 539 | 1/2001 |
| JP | 63-073348 | 2/1988 |
| JP | 10-312459 | 11/1998 |
| JP | 11-025045 | 1/1999 |
| JP | 2001-143009 | 5/2001 |
| KR | 2001-0008371 | 2/2001 |
| KR | 2001-0039242 | 5/2001 |
| WO | WO 00/59225 | 10/2000 |
| WO | WO 01/61640 A1 | 8/2001 |
| WO | WO 02/075677 | 9/2002 |

OTHER PUBLICATIONS

D. O'Mahony, et al., Artech House Inc., XP-002253364, pp. 45-48, "Electronic Payment Systems for E-Commerce", 2001.

* cited by examiner

*Primary Examiner*—Thomas R. Peeso
(74) *Attorney, Agent, or Firm*—Oblon, Spivak, McClelland, Maier & Neustadt, P.C.

(57) ABSTRACT

An IC card 16 according to the present invention is provided with an electronic value storing means, a request acquiring means, a verifying means, and an output means. The request acquiring means acquires an access request from display application 151 to electronic value 161 stored in the electronic value storing means, along with application authentication information held by the display application 151. The verifying means determines the validity of the application authentication information in accordance with the access request acquired by the request acquiring means. When the verifying means determines that the application authentication information is valid, the output means outputs substantive information of the electronic value 161 to the display application 151.

10 Claims, 8 Drawing Sheets

*Fig.4*

| Subject | Type of certificate | Accessible information |
|---|---|---|
| Certificate of application A (CN=aaa, ···) | certificate 2 | privilege information |
| Certificate of application B (CN=bbb, ···) | certificate 3 | substantive information and substantive information |
| * | certificate 1 or no certificate | ticket name of substantive information |

IC CARD, PORTABLE TERMINAL, AND ACCESS CONTROL METHOD

BACKGROUND OF THE INVENTION

1. Field of the Invention

The present invention relates to an IC card, a portable terminal, and an access control method.

2. Related Background Art

In recent years, portable terminals detachably provided with IC cards (including IC chips) have been developed with advance of multifunctionality of portable terminals and with achievement of large capacity of recording media An IC card holds user-specific data therein like information for identifying a user (ID, password, etc.) and a telephone number, and these data is normally encrypted in order to prevent falsification and replication thereof, or forgery of the IC card.

On the other hand, the increase in speed of radio communication and the development of data compression technologies has put information communication systems that permit portable terminals to acquire desired content data from server apparatus through networks such as the Internet and others, into practical use. In electronic transactions making use of such systems, electronic values are sometimes used as paying means without use of credit cards or cash.

An electronic value is digitized data which expresses some economical worth or into which some economical worth is transubstantiated. Examples of the electronic values include electronic money (also called electronic cash or electronic currency) expressing monetary value, electronic tickets provided in prepaid systems, and soon. An electronic ticket contains a record of data to be displayed in order to implement the function of the electronic ticket (the data will be hereinafter referred to as "substantive information").

SUMMARY OF THE INVENTION

However, the above prior art had the problem as described below. Namely, since the IC card is detachably mounted in the portable terminal, the user of the portable terminal can use the same IC card in a plurality of portable terminals through insertion and removal of the IC card. In order to permit the user of the portable terminal to utilize the aforementioned electronic value while effectively making use of such convenience of the IC card, it is desirable to store the electronic value inside the IC card.

However, the storage of the electronic value in the IC card raises concern about the disadvantage as follows. Namely, types of application programs downloadable into the portable terminals are rapidly increasing with increase in the capacity of data stored in the portable terminals and with development of radio communication technologies. Accordingly, if access to the electronic value is permitted according to access requests from all the application programs held in the portable terminal, there will arise concern about unauthorized use of the electronic value, which is undesirable in terms of security.

In view of the above circumstances, an object of the present invention is therefore to realize an IC card, a portable terminal, and an access control method permitting storage and readout of electronic value while maintaining high security.

In order to solve the above problem, an IC card according to the present invention is an IC card comprising: electronic value storing means for storing an electronic value; request acquiring means for acquiring an access request from an application program to the electronic value stored in the electronic value storing means, along with application authentication information held by the application program; verifying means for determining validity of the application authentication information in accordance with the access request acquired by the request acquiring means; and output means for outputting substantive information of the electronic value to the application program when the verifying means determines that the application authentication information is valid.

An access control method according to the present invention is an access control method in which an IC card acquires an access request from an application program, the access control method comprising: a request acquiring step wherein the IC card acquires the access request from the application program to an electronic value stored in electronic value storing means, along with application authentication information held by the application program; a verifying step wherein the IC card determines validity of the application authentication information in accordance with the access request acquired in the request acquiring step; and an output step wherein when it is determined in the verifying step that the application authentication information is valid, the IC card outputs substantive information of the electronic value to the application program.

According to these aspects of the invention, when it is determined that the application authentication information, which was acquired along with the access request from the application program to the electronic value, is valid, the substantive information of the electronic value is outputted to the application program. Namely, the IC card permits an access request from an application program with valid application authentication information but rejects an access request from an application program without valid application authentication information. This enables the IC card to control the access to the electronic value according to the application programs and thus makes it feasible to implement storage and readout of the electronic value while maintaining high security.

In the IC card according to the present invention, preferably, the application authentication information includes a digital signature and a public key certificate.

In the access control method according to the present invention, preferably, the application authentication information includes a digital signature and a public key certificate.

According to these aspects of the invention, the application authentication information includes the digital signature and the public key certificate. When the IC card is configured to determine the validity of the application program having requested access, based on the combination of the digital signature with the public key certificate, the access control can be performed with higher degree of accuracy. As a consequence, it becomes feasible to implement the storage and readout of the electronic value while maintaining a higher security level in the IC card.

In the IC card according to the present invention, preferably, the application authentication information further includes an attribute certificate.

In the access control method according to the present invention, preferably, the application authentication information further includes an attribute certificate.

The privilege information of the public key certificate is fixed within a period of validity, whereas for the privilege information of the attribute certificate the user is allowed to set a period of validity independent of the public key certificate. According to these aspects of the invention, therefore, the user can readily change the privilege information of the certificate, without need for a procedure of reissuing another certificate.

The IC card according to the present invention may be constructed in a configuration further comprising: physical information storing means for storing a physical information item indicating a physical feature of a principal; and determining means for collating the physical information stored in the physical information storing means, with a physical information item of a user having made the access request, to determine the identity of the physical information items, wherein when the determining means determines that the physical information items are identical with each other, the request acquiring means acquires user authentication information reflecting the result of the determination, wherein the verifying means determines validity of the user authentication information in accordance with the access request acquired by the request acquiring means, and wherein when the verifying means determines that the user authentication information is valid, the output means outputs the substantive information of the electronic value to the application program.

The access control method according to the present invention may be configured as a method further comprising a determining step wherein the IC card collates a physical information item indicating a physical feature of a principal, stored in physical information storing means of the IC card, with a physical information item of a user having made the access request, to determine the identity of the physical information items, wherein the request acquiring step is configured so that when it is determined in the determining step that the physical information items are identical with each other, the IC card acquires user authentication information reflecting the result of the determination, wherein the verifying step is configured so that the IC card determines the validity of the user authentication information in accordance with the access request acquired in the request acquiring step, and wherein the output step is configured so that when it is determined in the verifying step that the user authentication information is valid, the IC card outputs the substantive information of the electronic value to the application program.

According to these aspects of the invention, when it is determined that the physical information item of the principal (a regular registrant of the IC card) is identical with the physical information item of the user having made the access request, the substantive information of the electronic value is outputted to the application program. Namely, the IC card performs personal identification with reference to the physical information, so as to admit an access request based on a command of the principal but reject an access request based on a command of any other person than the principal. This enables the access control based on the combination of the application program authentication with the user authentication and further raises the security level of the IC card.

In the IC card according to the present invention, preferably, the physical information items are fingerprint information items.

In the access control method according to the present invention, preferably, the physical information items are fingerprint information items.

According to these aspects of the invention, the fingerprint information items are used as information indicating the physical feature of the principal, for the personal identification of the user having made the access request. Accordingly, through such an easy operation that the user lets a fingerprint reader read a fingerprint of a finger, the IC card can perform accurate personal identification, as compared with the authentication methods making use of a personal identification number or a password. The physical information used for the user authentication is not limited to the fingerprint information, but may be, for example, information about the iris or retina of the eye, a voice spectrum, a face image, or the like. Such user authentication making use of the physical information is extremely resistant in principle to spoofing and contributes to highly accurate personal identification.

In the IC card according to the present invention, more preferably, the access request is a request for display of the substantive information, and the output means makes display means display the substantive information of the electronic value in accordance with the display request.

In the access control method according to the present invention, more preferably, the access request is a request for display of the substantive information, and in the output step the IC card makes display means display the substantive information of the electronic value in accordance with the display request.

Among the electronic values, a considerable number of electronic values can implement functions specific thereto only when displayed (visualized) on the display means, like the electronic tickets or the like. In the case of such electronic values in particular, therefore, it is expected that the access request to the electronic value will be a request for display of the substantive information of the electronic value. For this reason, the substantive information is read out of the IC card and displayed on the display means, whereupon the user is allowed to read the electronic value.

In the IC card according to the present invention, preferably, the electronic value is an electronic ticket.

In the access control method according to the present invention, preferably, the electronic value is an electronic ticket.

When receiving a display request from an application program to an electronic ticket, the IC card verifies the validity of the application program whereby the substantive information of the electronic ticket is prevented from being displayed by an application program whose validity ha not been verified yet. This can prevent unauthorized use of the electronic ticket. When compared with the electronic money, the electronic tickets are often of intended use, and involve less concern about unauthorized use. Accordingly, an issuer of electronic tickets can distribute the electronic tickets more safely and efficiently.

In the IC card according to the present invention, more preferably, the electronic value storing means possesses tamper resistance.

In the access control method according to the present invention, more preferably, the electronic value storing means possesses tamper resistance.

According to the present invention, the electronic value is stored in the electronic value storing means with tamper resistance. This limits the access to the electronic value from the outside. Therefore, it is feasible to prevent injustices including falsification, theft, etc. of the substantive information by a third person. As a result, it is feasible to ensure security of the electronic value and confidentiality of the IC card.

A portable terminal according to the present invention comprises the aforementioned IC card detachably mounted, and application program storing means in which the application program is stored. As in this case, the present invention can not be applied to only the IC cards, but can also be applied to the portable terminals, of course.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a conceptual diagram showing the configuration of the access list.

DESCRIPTION OF THE PREFERRED EMBODIMENTS

A portable terminal according to the present invention will be described below with reference to the accompanying drawings.

Figure 1A:
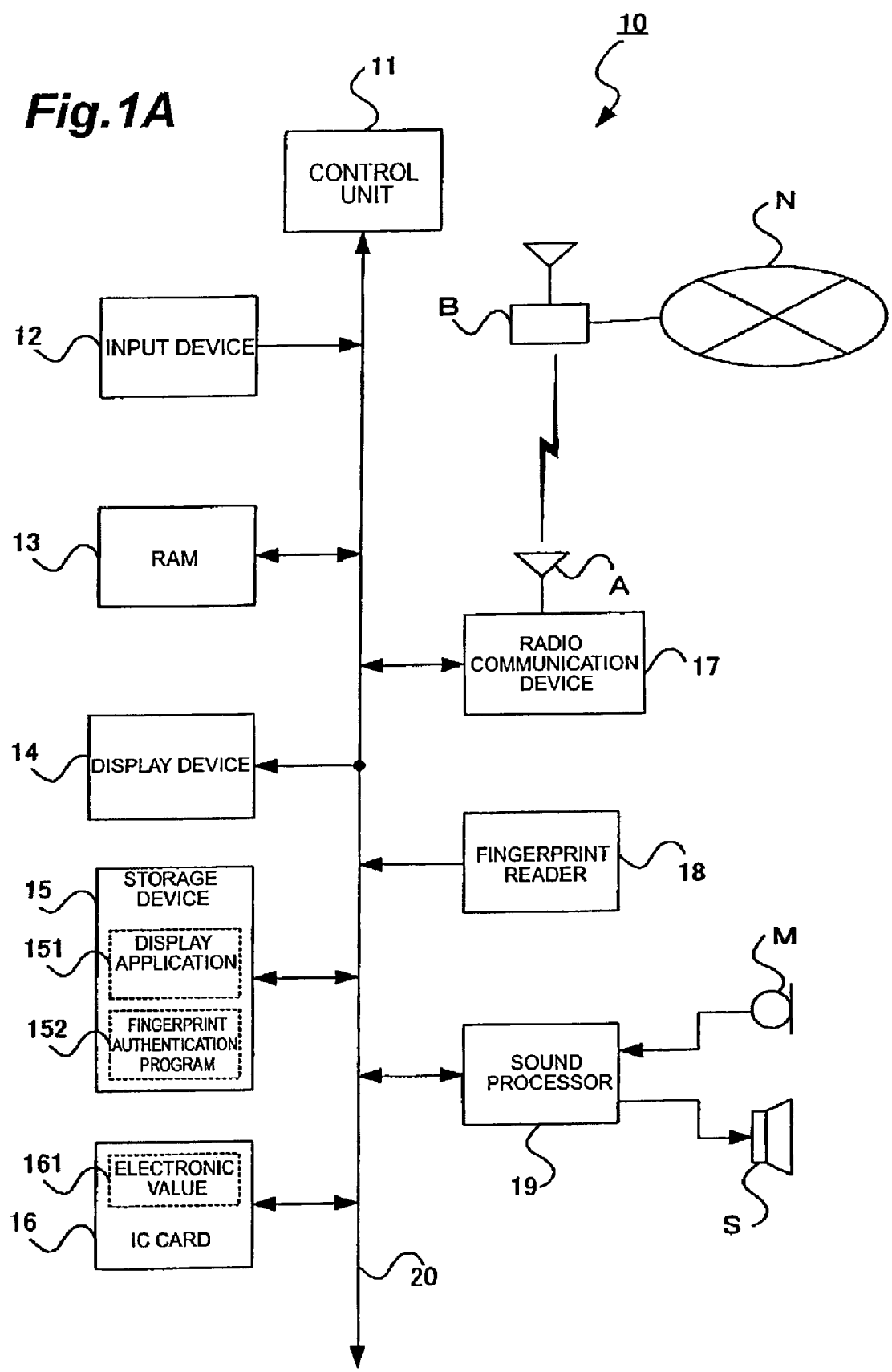
FIG. 1A is a diagram showing the configuration of the portable terminal and FIG. 1B a diagram showing the functional configuration of the IC card.

The configuration will be described first. FIG. 1A is a block diagram showing the functional configuration of portable terminal 10. The portable terminal 10 is comprised of a control unit 11, an input device 12, a RAM 13, a display device 14, a storage device 15, an IC card 16, a radio communication device 17, a fingerprint reader 18, and a sound processing device 19. These devices each are electrically connected through bus 20 so as to be able to send and receive various signals to and from each other.

The control unit 11 is configured to retrieve a program from the storage device 15 into the RAM 13 and perform concentrated control over each part according to the program. Specifically, the control unit 11 executes a variety of processing including an access control process to data (e.g., electronic value 161) stored in the IC card 16, in accordance with an input signal from the input device 12 and the program retrieved into the RAM 13, and temporarily saves the result of the processing in the RAM 13. Then it stores the processing result saved in the RAM 13, into a predetermined area inside the storage device 15 according to need.

The input device 12 is provided with various operation buttons for ordering selection of data and processing, ON/OFF of power, etc., and these various operation buttons are depressed alone or in combination to output an input signal according to a command to the control unit 11. The input device 12 is constructed of a transparent screen (so called a touch screen) in which devices for sensing contact with a finger or a dedicated pen are arranged on a display screen of display device 14, and is configured to output input signals according to coordinates of contact points to the control unit 11. The way of sensing contacts can be any method, e.g., a pressure-sensitive method of sensing change in pressure, an electrostatic method of sensing electric signals based on static electricity, and so on.

The RAM (Random Access Memory) 13 is constructed of a volatile semiconductor memory and is configured to temporarily save a program retrieved from the storage device 15 described below or data during the various processing executed by the control unit 11. The RAM 13 also has the function of VRAM (Video RAM) for temporarily saving data to be displayed on the display device 14.

The display device 14 is constructed of an LCD (Liquid Crystal Display), an EL (Electro Luminescence) device, or the like and is configured to display data on its screen in accordance with display signals from the control unit 11. The touch screen as the input device 12 as described above is laid over the screen of the display device 14.

The storage device 15 is constructed of a nonvolatile semiconduct or memory such as an EEPROM (Electrically Erasable and Programmable ROM), and is configured to store data necessary for execution of various processing, data generated as a result of execution of various processing, and so on. The storage device 15 stores an application program for display of data on the display device 14 (hereinafter referred to as "display application 151"). Furthermore, the storage device 15 also stores a fingerprint authentication program 152 for execution and control of fingerprint reader 18 described later. This fingerprint authentication program 152 is based on tamper-resistant software in order to enhance the confidentiality and make the falsification and abuse harder.

Figure 2:
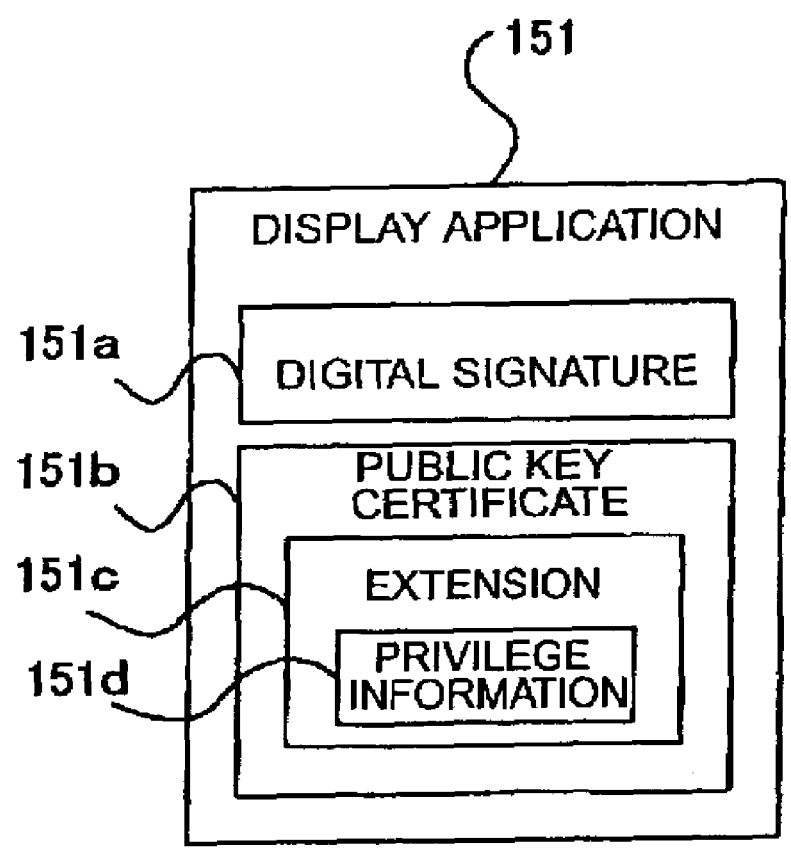
FIG. 2 is a conceptual diagram showing a configuration example of the display application.

The display application 151 will be described below with reference to FIG. 2. As shown in FIG. 2, the display application 151 has a digital signature 151a and a public key certificate 151b.

The digital signature 151a is an electronic signature issued and added by a certification organization being a third party, in order to ensure the validity of the display application 151 and clearly demonstrate the place of origin thereof. From the viewpoint of preventing leakage, the digital signature 151a is preferably an encrypted signature.

The public key certificate 151b has Extension (extended zone) 151c of the predetermined specification (e.g., the specification compliant with X.509) set by ITU-T. The Extension 151c contains a record of privilege information 151d to be collated with an access list 161c held by the electronic value 161 described later.

The IC (Integrated Circuit) card 16 is a card or chip type recording medium detachably mounted in the portable terminal 10. The IC card 16 stores data to be displayed on the display device 14 by a predetermined application program (e.g., the display application 151). The IC card 16 is desirably configured as a tamper-resistant device with high confidentiality, in view of secrecy and security of data.

Figure 1B:
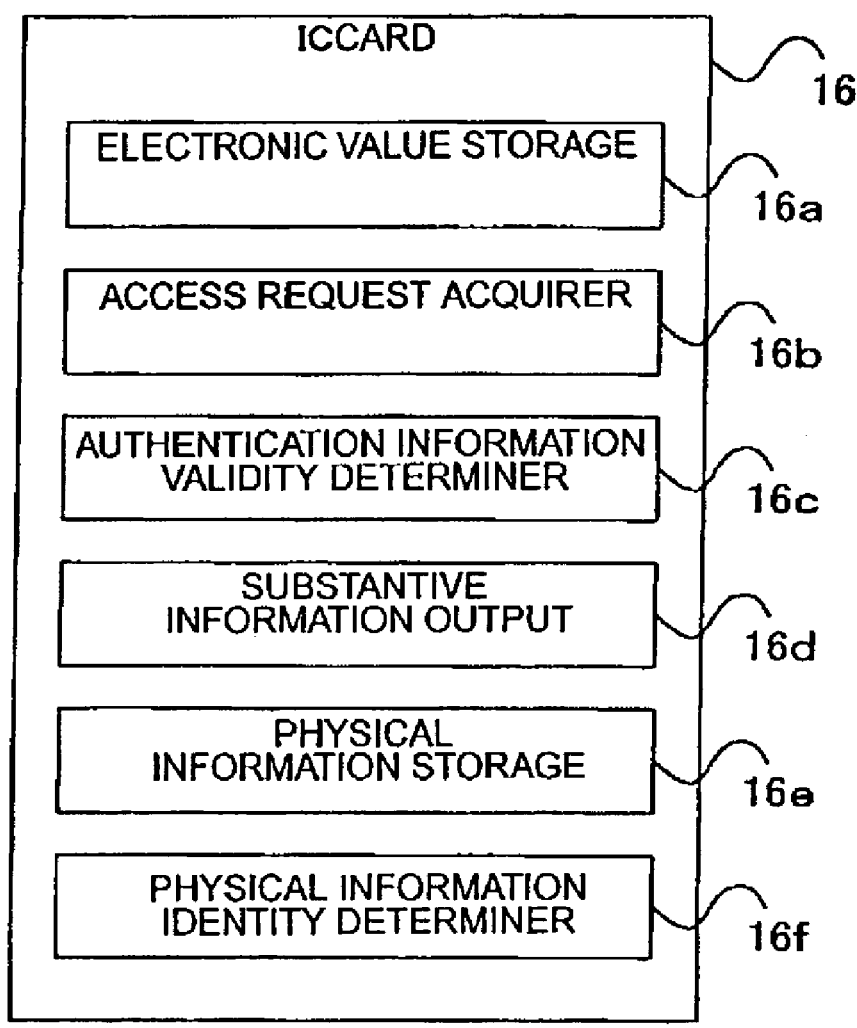

FIG. 1B is a diagram showing the functional configuration of the IC card 16. As shown in FIG. 1B, the IC card 16 is provided with an electronic value storage 16a, an access request acquirer 16b, an authentication information validity determiner 16c, a substantive information output 16d, a physical information storage 16e, and a physical information identity determiner 16f. These parts correspond to the electronic value storing means, request acquiring means, verifying means, output means, physical information storing means, and determining means, respectively In addition, although only the indispensable composition elements of IC card 16 according to the present invention are illustrated in FIG. 1B, this doesn't suppose that IC card 16 does not have the composition elements which the conventional IC card has.

Figure 3:
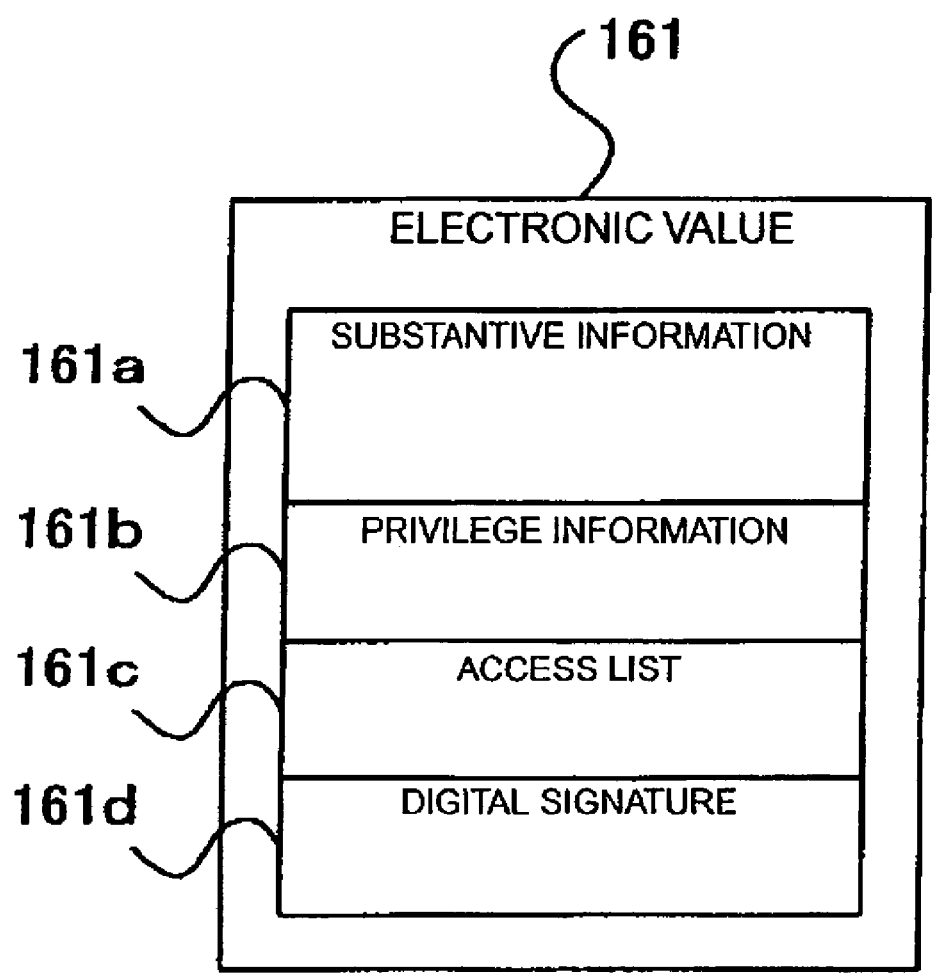
FIG. 3 is a conceptual diagram showing the configuration of the electronic value.

The electronic value 161 will be described below in detail, as an example of the data stored in the electronic value storage 16a of the IC card 16. FIG. 3 is a diagram showing a data configuration example of the electronic value 161. As shown in FIG. 3, the electronic value 161 has substantive information 161a, privilege information 161b, an access list 161c, and a digital signature 161d.

The substantive information 161a is data to be displayed on the display device 14 by the application program requesting display (e.g., the display application 151) when the user of the portable terminal 10 uses the electronic value 161. The substantive information 161a varies depending upon uses and types of electronic values, and, for example, in the case of the electronic value 161 being an electronic ticket, the substantive information 161a is information of a ticket name, an artist name, a venue of a performance, a date of the performance, a seat class and a seat number, a promoter, and so on. Namely, the user of the portable terminal 10 presents the information of these to an entrance/exit administrator or an entrance/exit monitor upon entrance into the venue of performance whereby the user is permitted to enter the desired performance venue.

The privilege information 161b is more detailed information about the substantive information 161a. For example, supposing the electronic value 161 is an electronic ticket, it is information about an artist of a performance admissible by the electronic ticket (an URL of an official website of the artist, or the like). For simplicity, the privilege information 161b is arranged to be included in the electronic value 161 itself in the present embodiment, but it is also possible to employ a configuration wherein the electronic value 161 contains a pointer indicating a storage location of the privilege information 161b and the privilege information 161b itself is stored at the storage location indicated by the pointer.

The access list 161c is a data list containing certificates indicating respective access authorities to the electronic value 161 and information that can be outputted (i.e., accessible information) according to the request for display from application programs, in correspondence with each other. Specifically, as shown in FIG. 4, the access list 161c has a Subject area 162c, a certificate type area 163c, and an accessible information area 164c.

The Subject area 162c contains data of certificates to permit access to at least the privilege information (e.g., CN=aaa . . . , CN=bbb . . . ) among the information held by the electronic value 161 shown in FIG. 3. The symbol "*" in the Subject area 162c indicates that access is permitted to only "ticket name of substantive information" even if an application program having requested display has data of any certificate.

The certificate type area 163c contains data indicating types of the certificates (e.g., "certificate 2," "certificate 3," "certificate 1 or no certificate") stored in the Subject area 162c. The term "no certificate" indicates that an application program having requested display has neither of the certificates.

Furthermore, the accessible information area 164c stores accessible information by the corresponding types of certificates (e.g., "privilege information," "substantive information and privilege information," "ticket name of substantive information"). This permits the IC card 16 to properly select information allowed to display by an application program, according to a type of a certificate held by the application program having requested display.

The digital signature 161d is an electronic signature issued and added by a certification organization being a third party, in order to ensure the validity of the electronic value 161 and clearly demonstrate the place of origin thereof. The digital signature 161d is preferably an encrypted signature in view of prevention of leakage.

In the IC card 16, characteristic points of a fingerprint of a principal registered as a user of the IC card 16 (normally, an owner of the portable terminal 10) are preliminarily registered as fingerprint information in the physical information storage 16e. The fingerprint information is data of characteristic points extracted from an image of a fingerprint of a finger for personal identification. The physical information identity determiner 16f of the IC card 16 compares and collates the finger print information of the principal with the fingerprint information of the user outputted from the fingerprint reader 18 described hereinafter, to determine the identity of the user and the principal on the basis of the result thereof. This results in performing the personal identification of the user having made an access request to the electronic value 161 (e.g., a display request).

The radio communication device 17 performs control of radio communication with a base station B. Specifically, the radio communication device 17 is a circuit having a modem (not shown) for modulating and demodulating signals, and a codec (not shown) for coding and decoding signals, and is provided with an antenna A. The antenna A is retractably disposed at the top part of a housing of the portable terminal 10 and is used for transmission and reception of radio waves to and from the base station B.

The fingerprint reader 18 is comprised of a reading part and an extracting part. The fingerprint reader 18 is configured to extract characteristic points from an image of a fingerprint of a user's finger read by the reading part, according to the fingerprint authentication program 152 retrieved from the storage device 15, and to output them as fingerprint information of the user to the IC card 16.

The sound processing device 19 is comprised of a converter, an amplifier, etc. and is provided with a microphone M and a speaker S. The sound processing device 19 is configured to convert audio data from the control unit 11 into analog signals by the converter and emit sound from the speaker S through the amplifier, during calls. The sound processing device 19 also converts audio signals from the microphone M into digital signals by the converter and outputs the digital signals to the control unit 11, during calls.

The operation of the portable terminal 10 according to the present invention will be described below, together with an access control method according to the present invention. Each of the following steps is implemented when the IC card 16 or control unit 11 executes a program stored in the storage device 15 or IC card 16 shown in FIG. 1A.

Figure 5:
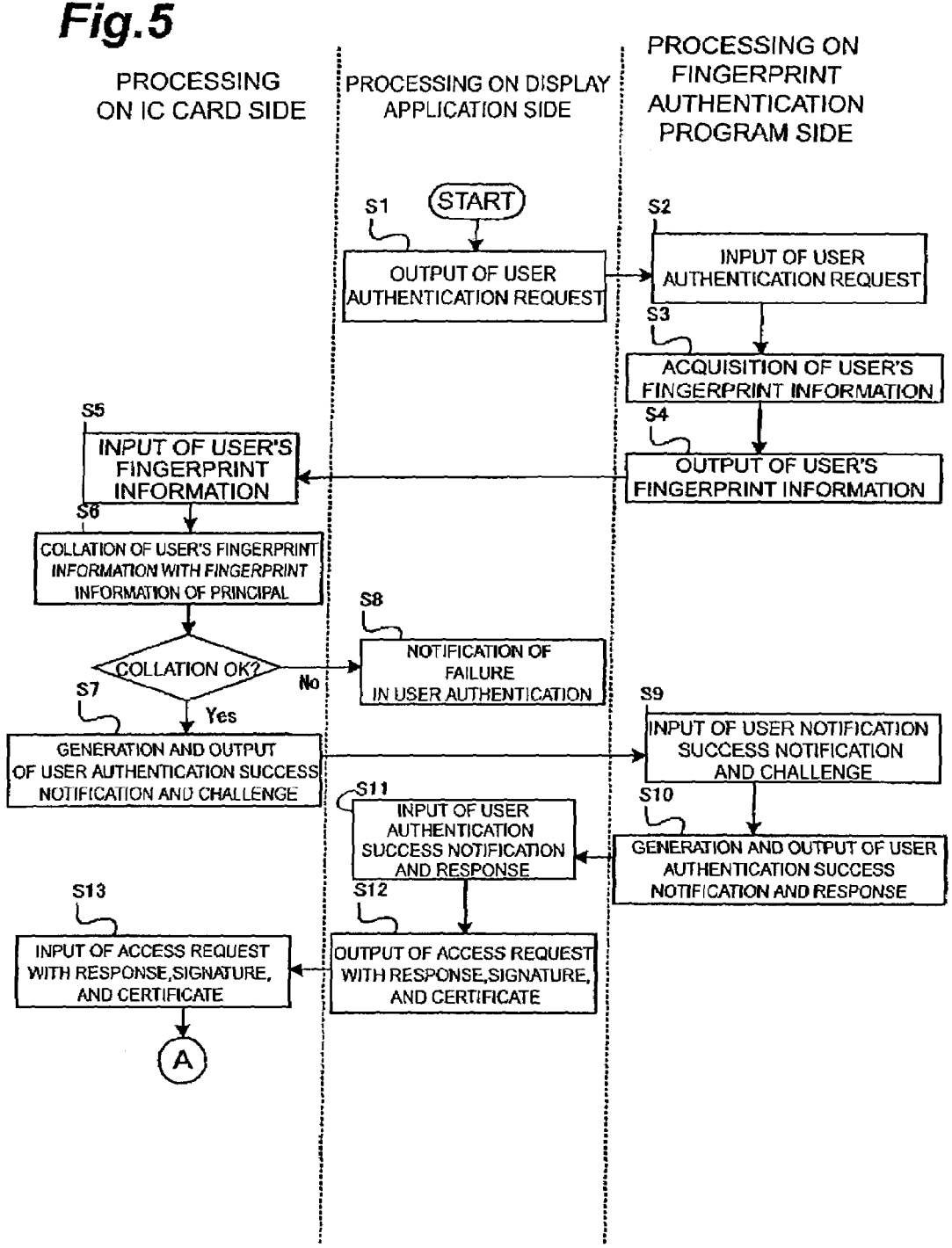
FIG. 5 is a flowchart showing the first half of the access control processing executed by the portable terminal.

FIG. 5 is a flowchart showing the flow of the access control processing executed by the portable terminal 10. The description of the operation is based on the premise that when the IC card 16 is mounted in the portable terminal 10, the IC card 16 and the fingerprint authentication program 152 share a private key (not shown) with each other.

With a request for display of the electronic value 161 stored in the IC card 16, a user authentication request is first outputted from the display application 151 to the fingerprint authentication program 152 (S1). The display request herein is a display request from the display application 151, but the display request from the display application 151 via the control unit 11 also encompasses a display request made through the input device 12 by the user, of course.

When the user authentication request outputted in S1 is fed into the fingerprint authentication program 152 (S2), the fingerprint authentication program 152 starts reading the fingerprint of the user of the portable terminal 10 by the fingerprint reader 18 (S3). Characteristic points satisfying predetermined conditions are extracted from the image of the read fingerprint and are outputted as a fingerprint information item of the user to the IC card 16 (S4).

When the IC card 16 receives the fingerprint information outputted in S4 (S5), it compares and collates the fingerprint information item of the user received in S5, with the fingerprint information item of the principal preliminarily registered in the IC card 16, to determine the identity of the fingerprint information items (S6). When the collation results in determining that the fingerprint information items are identical with each other, the IC card 16 generates a random number (hereinafter referred to as "Challenge").

The Challenge thus generated, together with a user authentication success notification indicating that the personal identification was successfully completed, is outputted to the fingerprint authentication program 152 (S7). On the other hand, if the collation in S6 results in determining that the fingerprint information items are different from each other, the IC card 16 outputs a message to the display application 151 (S8). This message is data to notify the user that the user authentication ended in failure and the display request was rejected.

Then the user authentication success notification and Challenge outputted in S7 are fed into the fingerprint authentication program 152 (S9). Subsequently, the fingerprint authentication program 152 generates a result of calculation of Challenge using the private key shared with the IC card 16 in advance and a predetermined one-way function (e.g., Keyed Hash, or the like) (the result will be referred to hereinafter as "Response"). The Response thus generated, together with the aforementioned user authentication success notification, is outputted to the display application 151 (S10).

The display application 151 receives the user authentication success notification and Response outputted in S10 (S11). In conjunction therewith, the display application 151 outputs a request for access to the electronic value 161, to the IC card 16. The access request is outputted along with the above Response and with the digital signature 151a and public key certificate 151b retrieved from the display application 151 (S12).

Figure 6:
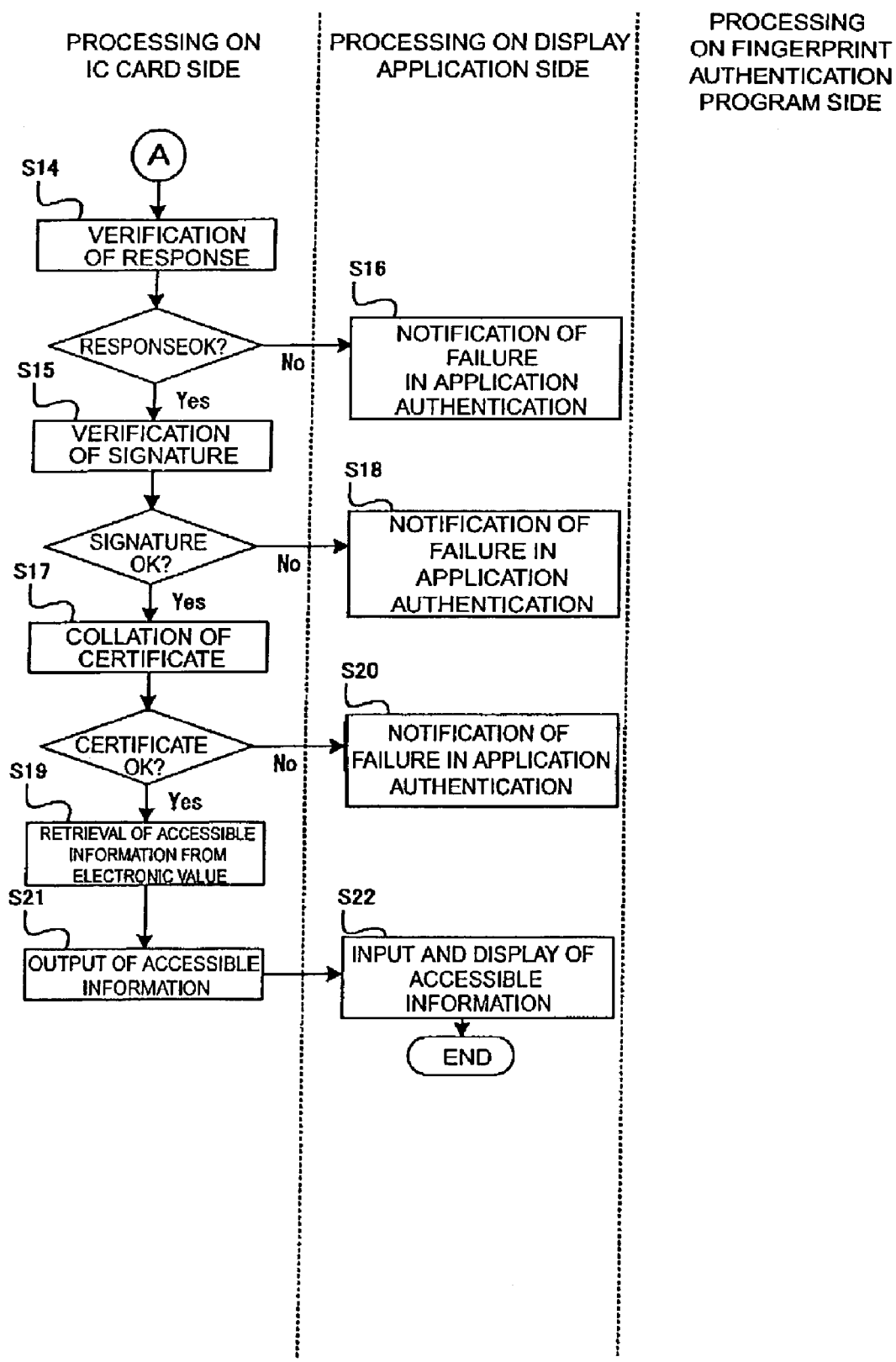
FIG. 6 is a flowchart showing the second half of the access control processing executed by the portable terminal.

Then the access request acquirer 16b of the IC card 16 receives the access request outputted along with the digital signature 151a and public key certificate 151b and with the Response in S12 (S13), and the IC card 16 starts verifying the Response (transferring to S14 in FIG. 6). The verification of Response is conducted with reference to the aforementioned private key that the IC card 16 shares with the fingerprint authentication program 152 in advance.

When the verification in S14 results in determining that the Response is valid, i.e., that it was generated based on the Challenge generated by the IC card 16, the IC card 16 then performs verification of the digital signature 151a (S15). On the other hand, if the verification in S14 results in determining that the Response is invalid, the IC card 16 outputs a message to the display application 151 (S16). This message is one notifying the user that the application program authentication ended in failure and the display request was rejected.

When the verification in S15 results in determining that the digital signature 151a is valid, i.e., that it was intended for the issuer of the electronic value 161, the authentication information validity determiner 16c of the IC card 16 compares and collates the public key certificate 151b received in S13, with the certificate stored in the Subject area 162c of the access list 161c (S17). On the other hand, if the verification in S15 results in determining that the digital signature 151a is invalid, the user is notified of a message indicating that the display request was rejected (S18), as in the case of the process of S16.

Furthermore, when the result of the collation in S17 is that the public key certificate 151b agrees with one of the certificates stored in the Subject area 162c, the accessible information corresponding to the agreed certificate is referred to from the accessible information area 164c. Then the accessible information is retrieved from the electronic value 161 (cf. FIG. 3) according to the result of the reference (S19). For example, supposing the public key certificate 151b is data identical with the certificate held by the application B, the accessible information corresponding thereto is the substantive information and privilege information. Therefore, the substantive information 161a and privilege information 161b is retrieved as display target data from the electronic value 161.

On the other hand, if the result of the collation in S17 is that the public key certificate 151b disagrees with all the certificates stored in the Subject area 162c of the access list 161c, the accessible information corresponding to "*" (i.e., the ticket name of the substantive information) is retrieved from the substantive information 161a of the electronic value 161. The portable terminal may also be configured in a configuration wherein when the public key certificate 151b disagrees with all the certificates stored in the Subject area 162c, a message indicating that the display request was rejected is outputted to the display application 151, as indicated in 520.

The substantive information output 16d of the IC card 16 outputs the accessible information retrieved from the electronic value 161 in S19, to the display application 151 (S21). Here the sequential processing of S14 to S21 is executed inside the IC card 16 with tamper resistance, for the purpose of ensuring the reliability of the user authentication and application authentication.

Then the accessible information outputted in S21 is fed into the display application 151, and the display application 151 makes the display device 14 of the portable terminal 10 display it (S22). For example, supposing the accessible information outputted in S21 is the substantive information, the user of the portable terminal 10 is allowed to enter the desired venue or facility by presenting the substantive information.

As described above, the portable terminal 10 according to the present invention is configured so that the IC card 16 comprises the electronic value storing means, request acquiring means, verifying means, and output means. The request acquiring means acquires the display request from the display application 151 to the electronic value 161 stored in the electronic value storing means, along with the digital signature 151a and the public key certificate 151b (corresponding to the application authentication information). The verifying means determines the validity of the digital signature 151a and the public key certificate 151b in accordance with the above display request acquired by the request acquiring means. When the verifying means determines that the digital signature 151a and the public key certificate 151b are valid, the output means outputs the substantive information 161a to the display application 151.

Namely, the IC card 16 admits the display request from the application program with the valid digital signature and public key certificate, but rejects the display request from the application program without the valid digital signature and the public key certificate. This enables the IC card 16 to control the access to the electronic value 161 according to the application programs and thus makes it feasible to implement the storage and readout of the electronic value while maintaining high security More specifically, the electronic value 161 itself stored in the IC card 16 is provided with the access list 161c, which enables the access control (including exclusive access control) similar to that in the case where access rights are set in electronic value units. The display application 151 is arranged to bear the digital signature 151a and the public key certificate 151b, which enables the access control similar to that in the case where access rights are set in application program units. Furthermore, the Response reflecting the result of the determination of identity of fingerprint information is used in the user authentication, which enables the access control similar to that in the case where access rights are set in user units.

Here the storage of the electronic value 161 in the IC card 16 presents the following advantage, as compared with the case where the electronic value 161 is stored in the storage device 15. Namely, since the IC card 16 is detachably mounted in the portable terminal 10, the IC card 16 can be mounted in another portable terminal, whereby the access control function to the electronic value 161 can also be applied to the other portable terminal. The function like this is particularly effective in the case where the user selectively uses a plurality of portable terminals according to uses or circumstances and where an application program that can display the electronic value 161 is installed in only one portable terminal.

Figure 7:
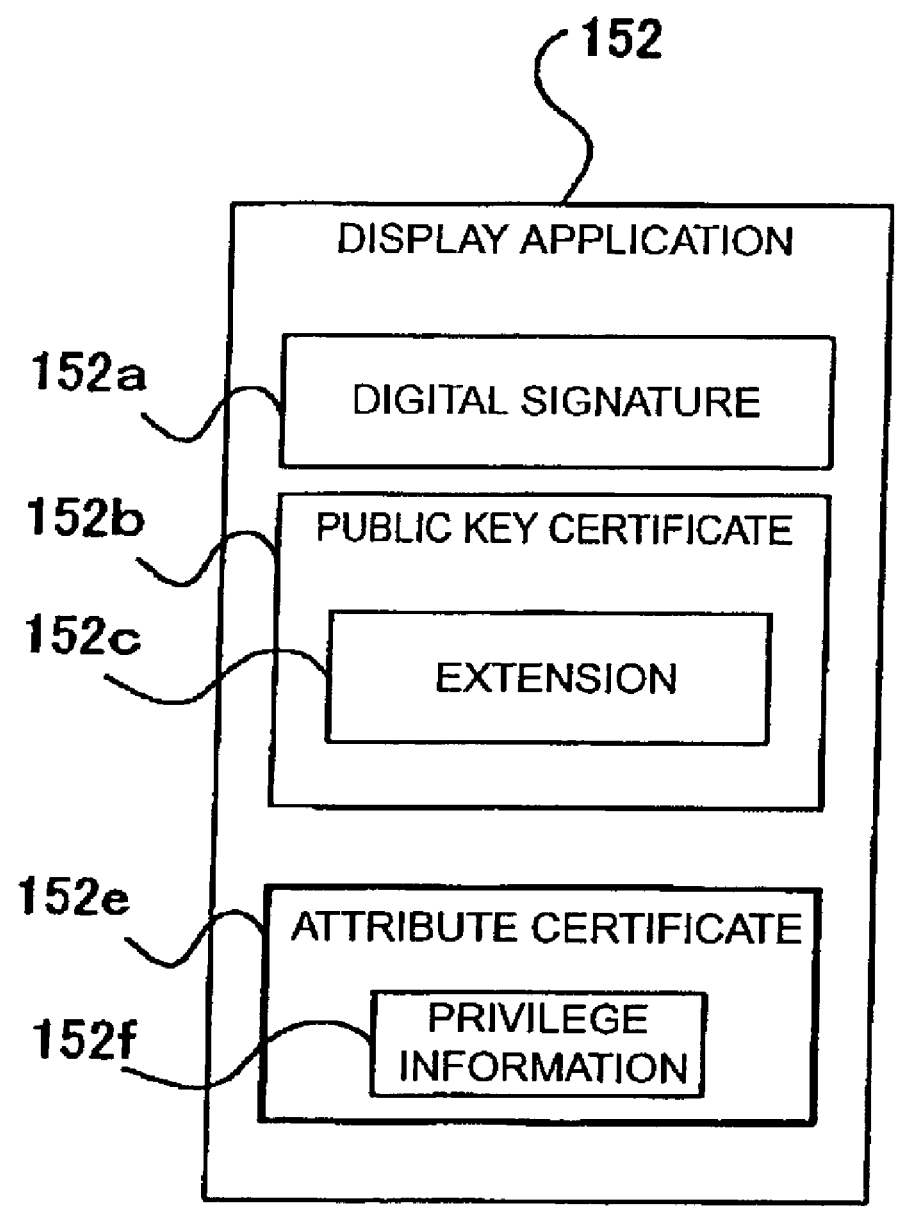
FIG. 7 is a conceptual diagram showing another configuration example of the display application.

It is noted herein that the contents of the description in the present embodiment are just a preferred example of the portable terminal according to the present invention and the invention is not limited to this example. A display application 152 stored in the storage device 15 of the portable terminal 10, which is a modification of the present embodiment, will be described below with reference to FIG. 7. As shown in FIG. 7, the display application 152 further has an attribute certificate 152e, in addition to the digital signature 152a and public key certificate 152b.

The digital signature 152a and public key certificate 152b are much the same as the digital signature 151a and public key certificate 151b, which were described with reference to FIG. 2, and thus the description thereof is omitted herein. The attribute certificate 152e is a known attribute certificate issued by a certification organization different from the issuer of the public key certificate 152b and defined according to the predetermined specification (e.g., the specification of X.509) set by ITU-T, as in the case of Extension 152c. The attribute certificate 152e contains a description of information to enable reference to the public key certificate 152b.

The portable terminal 10 refers to privilege information 152f of the attribute certificate 152e on the occasion of executing the collation process between the certificate and the access list (S17 in FIG. 6). If the privilege information is described in Extension 152c, the privilege information is fixed within a period of validity of the public key certificate 152b. For this reason, in order to modify the contents of the description of the privilege information, there is need for a procedure of reissuing the public key certificate. In contrast to it, the attribute certificate 152e allows the user to set a period of validity independent of the public key certificate 152b, and thus the privilege information described therein is readily modified.

The portable terminal 10 maybe a PDA (Personal Digital Assistance) or a cellular phone having a UIM (User Identity Module) or an SIM (Subscriber Identity Module) as an IC card on a detachable basis. The IC card can be any electronic device with tamper resistance, and there are no specific restrictions on the shape thereof.

Described last are a program for implementing the access control technology according to the present invention and a computer-readable recording medium (hereinafter referred to simply as "recording medium") in which the foregoing program is recorded. The recording medium is a medium that can induce change states of energy such as magnetism, light, electricity, or the like according to the description contents of a program against a reading device installed as one of hardware resources of general-purpose computers or the like and that can transmit the description contents of the program to the reading device in the format of signals corresponding to the change states. Such recording media include, for example, those detachably mounted on the computers (including the portable terminals, PHS terminals, etc.) like the IC cards of UIM and others, magnetic disks, optical disks, and magnetooptical disks, and nonvolatile semiconductor memories such as HDs (Hard Disks) fixedly incorporated in the computers, firmware integrally fixed in the computers, and so on.

The above program may be configured so that part or the whole thereof is transmitted through a transmission medium such as a communication line or the like from another device to be received by the radio communication device of the portable terminal according to the present invention and recorded therein. Conversely, the above program may also be configured to be transmitted from the portable terminal according to the present invention through the transmission medium to another device to be installed therein.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An IC card, comprising:
   electronic value storing means for storing an electronic value;
   request acquiring means for acquiring an access request from an application program to the electronic value stored in said electronic value storing means, along with application authentication information held by the application program;
   verifying means for determining validity of the application authentication information in accordance with the access request acquired by said request acquiring means;
   output means for outputting substantive information of said electronic value to said application program when said verifying means determines that said application authentication information is valid; and
   physical information storing means for storing a physical information item indicating a physical feature of a principal.

2. The IC card according to claim 1, wherein said application authentication information includes a digital signature and a public key certificate.

3. The IC card according to claim 2, wherein said application authentication information further includes an attribute certificate.

4. The IC card according to claim 1, further comprising:
determining means for collating the physical information item stored in said physical information storing means, with a physical information item of a user having made said access request, to determine the identity of the physical information items,
wherein when said determining means determines that said physical information items are identical with each other, said request acquiring means acquires user authentication information reflecting the result of the determination,
wherein said verifying means determines validity of the user authentication information in accordance with the access request acquired by the request acquiring means, and
wherein when the verifying means determines that the user authentication information is valid, said output means outputs the substantive information of said electronic value to said application program.

5. The IC card according to claim 4, wherein said physical information items are fingerprint information items.

6. The IC card according to claim 1, wherein said access request is a request for display of the substantive information, and
wherein said output means makes display means display the substantive information of the electronic value in accordance with said display request.

7. The IC card according to claim 6, wherein said electronic value is an electronic ticket.

8. The IC card according to claim 1, wherein said electronic value storing means possesses tamper resistance.

9. A portable terminal comprising:
the IC card as set forth in claim 1, said IC card being detachably mounted; and
application program storing means in which said application program is stored.

10. An access control method in which an IC card acquires an access request from an application program, said access control method comprising:
a request acquiring step wherein said IC card acquires the access request from the application program to an electronic value stored in electronic value storing means of the IC card, along with application authentication information held by the application program;
a verifying step wherein said IC card determines validity of the application authentication information in accordance with the access request acquired in said request acquiring step;
an output step wherein when it is determined in the verifying step that the application authentication information is valid, the IC card outputs substantive information of the electronic value to the application program; and
collating a physical information item stored in a physical information storing means of the IC card, with a physical information item of a user having made said access request, to determine the identity of the physical information item.

* * * * *